United States Patent [19]
Johnson et al.

[11] Patent Number: 5,287,477
[45] Date of Patent: Feb. 15, 1994

[54] MEMORY-RESOURCE-DRIVEN ARBITRATION

[75] Inventors: Leith L. Johnson; Russell C. Brockmann; William S. Jaffe, all of Fort Collins, Colo.

[73] Assignee: Hewlett-Packard Company, Palo Alto, Calif.

[21] Appl. No.: 741,703

[22] Filed: Aug. 7, 1991

[51] Int. Cl.⁵ ............................................. G06F 13/14
[52] U.S. Cl. ........................... 395/425; 364/DIG. 1; 364/240.8; 364/243; 364/242.1
[58] Field of Search .................. 395/400, 425; 364/200 MS File, 900 MS File

[56] References Cited
U.S. PATENT DOCUMENTS 3,978,451 8/1976 Ito et al. .................. 340/825.05
4,597,104 6/1986 Ohki et al. ................ 340/825.03

Primary Examiner—David L. Robertson
Attorney, Agent, or Firm—Augustus W. Winfield

[57] ABSTRACT

A method and apparatus to improve memory performance in a computer bus system. Memory is divided into interleaved blocks and memory addresses are mapped into block identification numbers. Master devices keep track of which parts of memory are busy by storing memory block identification numbers in local queues whenever memory is accessed. Block identification numbers are removed from local queues when the memory transaction is complete. Master devices arbitrate for access to the bus for memory transactions only if the target memory block identification number is not in the local queue.

10 Claims, 5 Drawing Sheets

MEMORY-RESOURCE-DRIVEN ARBITRATION

FIELD OF INVENTION

The present invention relates generally to computer systems. More particularly, the present invention relates to improving the performance of a computer data bus system by avoiding arbitration when desired memory resources are busy.

BACKGROUND OF THE INVENTION

The present invention is part of a new and improved computer system, parts of which are described in other related applications. The computer system bus basic arbitration protocol is described in U.S. application Ser. No. 07/436,144 filed Nov. 13, 1989 by Ross M. Wille and Richard J. Carter entitled "Distributed Fair Arbitration Scheme for Providing Access to a Data Communication Bus", now U.S. Pat. No. 5,151,994.

The computer system incorporates a bus with four control states described in U.S. application No. 7,694,265 filed Apr. 29, 1991 by William Jaffe, Russell C. Brockmann and Leith Johnson entitled "Quadrature Bus Protocol for Carrying Out Transactions in a Computer System" (hereinafter called the Jaffe-1 application). The computer memory has a block interleaving scheme described in U.S. application Ser. No. 07/679,868 filed Apr. 3, 1991 by Russell C. Brockmann, William Jaffe and William Bryg entitled "Flexible N-way Memory Interleaving" (hereinafter called the Brockmann-1 application). Communication with slow devices is described in U.S. application No. 07/705,873 filed May 28, 1991 by Russell C. Brockmann, William Jaffe and Leith Johnson entitled "Method of Reducing Wasted Bus Bandwidth Due to Slow Responding Slaves in a Multiprocessor Computer System". All of these applications are specifically incorporated herein by reference for all that they teach. The present invention comprises improvements in memory system performance and design of the systems disclosed in these applications.

Modern computer systems often have a plurality of "intelligent" devices interconnected by a high speed communications link. Within a single computer, multiple processors may use an internal data bus to communicate with each other, with peripheral I/O devices and with shared memory subsystems. A transaction is a communication between two devices. A device requesting access to the bus is called a master. The target device of the transaction is called a slave. An arbitration method, also called an arbitration protocol, determines which requesting device gains access to the bus when multiple devices simultaneously contend for access.

In most computer systems, memory transactions comprise the overwhelming majority of transactions between devices. Processors send data to memory and retrieve data from memory. Peripheral I/O devices send data directly to memory or receive data directly from memory via direct memory access (DMA). Therefore, optimization of memory transactions is a critical element in obtaining good system performance. A typical memory transaction consists of a master device sending a memory address to a memory subsystem followed by the memory slave device sending data from that address to the requesting master device.

In the simplest systems, the entire system waits for the completion of a memory transaction before any other transactions can be initiated. In pipelined systems, multiple transactions can be in process simultaneously. For example, multiple requests for memory may be initiated before the first request is completed. In split protocol systems, sending the address and sending the data are separate transactions. In split protocol systems, the requesting master device arbitrates for access to the bus, sends the memory address and read command to the slave memory device, and then releases the bus. The memory device then processes the request, arbitrates for access to the bus, and sends the data back to the requesting master device. This split transaction frees the bus for other transactions during the memory latency period.

A particular memory subsystem may be the target of several consecutive or closely spaced memory transactions. In a split protocol system, memory systems typically employ a queue to store these requests. In any practical system, the depth of the queue is limited. If the input queue is full, the system must then provide a mechanism for the slave to notify the master that a requested transaction cannot be completed. On notification of a "busy" slave, the master will typically wait some defined amount of time and repeat the transaction. There is usually some companion strategy or rule to guarantee that the master will eventually complete its transaction.

In addition to a request queue, the memory controller may also employ an output queue. This allows the memory controller to place read data into a buffer pending successful arbitration of the bus. During this arbitration and eventual forwarding of data to the requesting master, the memory controller is free to begin processing the next request it may have in its request queue.

In the discussion above, the transaction involves a master device requesting data from memory. A memory transaction may instead entail a master device sending data to be stored into memory. In this case, the address is followed by data to be stored. The memory system typically needs an input queue for input data. The memory system then requires time to store received data before the memory system is available for another transaction.

In the system described above, masters will often gain access to the bus only to find that the target slave is busy. This "busy" transaction wastes time for the requesting master and ties up the bus, preventing useful access by other devices. Additionally, request queues, output queues, input queues and arbitration circuitry all add latency time, cost and complexity to memory subsystems. Hence, there is a need to improve performance by eliminating busy transactions and to improve the latency time of memory subsystems by elimination of queues. Also, there is a need to reduce the cost and complexity of memory subsystems by elimination of arbitration circuitry and queues.

SUMMARY OF THE INVENTION

The present invention improves a computer bus system performance by minimizing wasted bus memory transactions. A wasted bus transaction is one in which a requesting device successfully acquires the bus but the corresponding target device is busy. The present invention also improves a computer bus performance by elimination of memory subsystem queues. The present invention also simplifies the design and reduces the cost of memory controller functions for computer bus systems.

The present invention takes advantage of the fact that memory access times can be made a constant time interval. The fundamental time from the time of assertion of an address until the time that data is ready is a known and quantifiable time. If refresh cycles are needed, the effects of the refresh cycles are removed by making them system synchronous.

The present invention eliminates queues in the memory subsystems and instead, places a queue in each master that is capable of initiating a memory transaction. This has two benefits. The first benefit is performance improvement and simplification of the memory subsystem. The second benefit is that it enables masters to detect, in advance, whether a memory block will be busy. Each master contains a queue of all memory blocks currently being used. Each time a master successfully acquires the bus and requests access to a memory block, the block address is sent to all masters on the bus, and each master then adds the block ID to its local queue. After the standard memory transaction time, each master drops the corresponding block ID from its local queue. When a master desires a memory transaction, it first checks its local memory block address queue before requesting access to the bus. If the target block ID is in the queue, then the memory block is busy and the master does not initiate a request for bus access. Masters initiate a memory transaction only when it is known in advance that the memory block is not busy.

The present invention also eliminates arbitration by the memory system for bus access when data is ready. The present invention provides separate address and data busses. This enables masters to arbitrate for access to the address bus without interfering with simultaneous data transfer on the data bus. Fixing all memory transactions to a standard time eliminates data bus contention conflicts. Therefore, in a memory data request transaction, a slave memory subsystem places data on the data bus without arbitration at the end of the standard time.

DETAILED DESCRIPTION OF THE PREFERRED EMBODIMENT OF THE INVENTION

Figure 1:
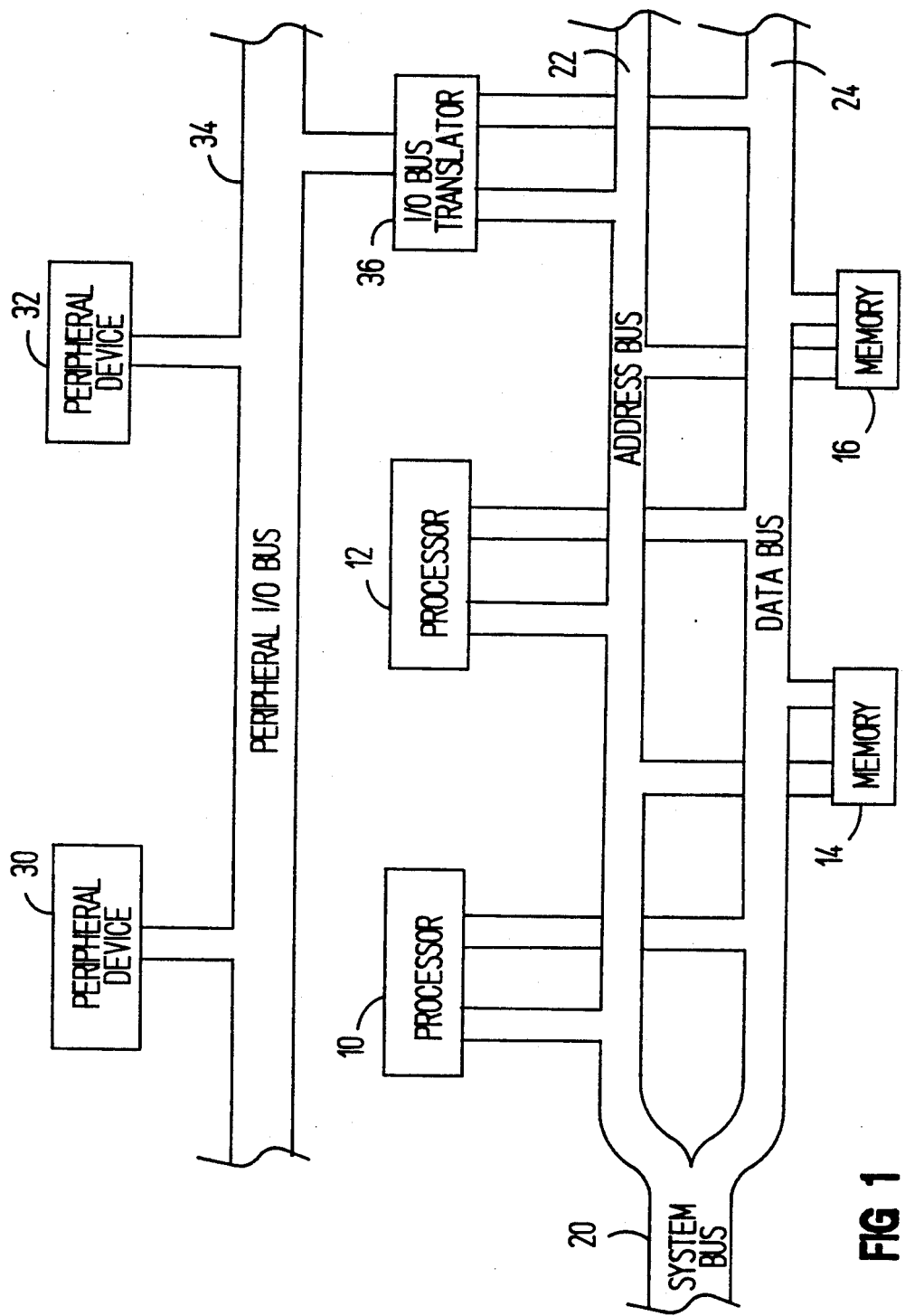
FIG. 1 depicts a computer bus system with processors, memory, peripheral devices and separate address, data and peripheral I/O busses.

FIG. 1 illustrates a computer bus system. Processors 10, 12 and memory devices 14, 16 are interconnected by a system bus 20. The system bus 20 is divided into separate address bus 22 and data bus 24. All memory and I/O transactions are initiated on address bus 22. Memory data is transferred on the data bus 24.

In this specification, an "I/O transaction" refers to a transaction between devices on the address bus (memory is not involved). For example, a register in one processor being read by another processor is treated as an I/O transaction. I/O transactions may also include slower mechanical peripherals such as disk and tape drives. In FIG. 1, these are illustrated by peripheral devices 30, 32. In general, peripheral devices are not connected directly to the system bus 20, but are connected to a separate peripheral I/O bus 34. I/O bus translator 36 buffers timing and control between system bus 20 and peripheral I/O bus 34. Data for an I/O transaction is transferred on the address bus 22. In addition, the I/O bus translator 36 may transfer data by DMA on the data bus 24, in which case it is treated as a memory transaction, not as an I/O transaction.

A master requests data from memory by placing a memory address and a "read" command on the address bus 22 during the appropriate control states. At some later time, memory responds with data on data bus 24. The system bus 20 is a pipeline bus system in that multiple addresses can be sent out before the first data is returned. The time between data request and data return is fixed by the system (standard transaction time). As explained further below, all system bus transactions, whether memory or I/O, are completed in exactly the same standard transaction time.

When processors 10, 12 on the address bus 22 request data from peripheral devices 30, 32 on the peripheral I/O bus 34, the I/O bus translator 36 will return a "busy" data signal. This "busy" transaction requires the standard transaction time. When the peripheral device 30, 32 is ready, the I/O bus translator 36 signals the original requesting processors 10, 12 to initiate a new transaction. In the new transaction, data will be returned by the bus translator 36, requiring the standard transaction time to complete the transaction. For any data request, a transaction (either "data ready" or "busy" data) is completed in the standard transaction time.

Figure 2:
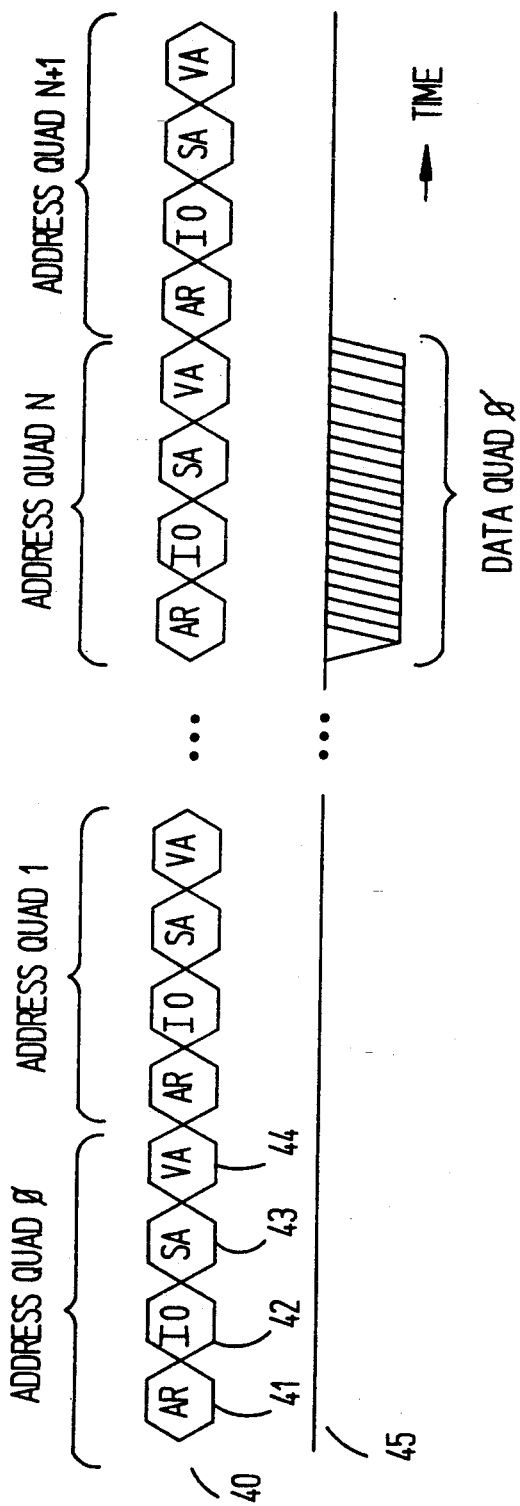
FIG. 2 is a timing diagram illustrating cycles of states on an address bus and data on a separate data bus.

FIG. 2 illustrates system bus timing. Address bus timing 40 is split into repeated groups of four consecutive control states. Each group of four consecutive control states is called a quad. The four address bus control states are the arbitrate (AR) state 41, I/O (IO) state 42, slave address (SA) state 43, and virtual address (VA) state 44. Arbitration of contention for the system bus occurs only during the arbitrate state. Data for I/O transactions is transferred on the address bus during the I/O state. Addresses for transactions between "master processors" and "slave processors" are transmitted during the slave address state. Virtual memory addresses are transmitted during the virtual address state. The Jaffe-1 application provides more detail on the functions of the four address bus states.

FIG. 2 also illustrates the delay between address quads and corresponding data quads. By way of example, assume that a master requests memory data during address quad 0. At some fixed time later data quad 0 is transferred on the data bus in response to the request for data during address quad 0. Note that it is not necessary for data quads and address quads to be perfectly aligned. That is, data is returned in groups of four states but the first control state for the four data states is not required to be the arbitrate state 41.

Figure 3:
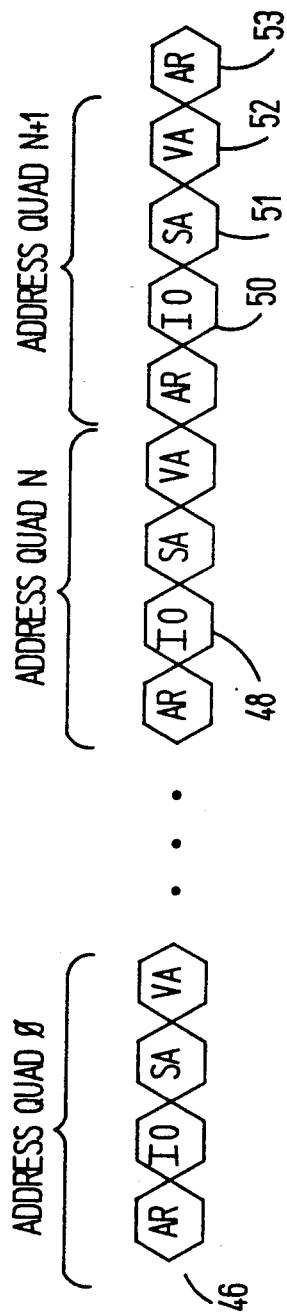
FIG. 3 is a timing diagram illustrating an I/O transaction.

FIG. 3 illustrates the delay between address quads and data transferred by an I/O transaction. By way of example, assume that a processor initiates an I/O transaction during address quad 0. If the data is requested from a device on the address bus, the appropriate slave device will place data on the address bus during the I/O state of address quad N (state 48). If the data is requested from a peripheral I/O device, the I/O bus translator 36 (FIG. 1) will transfer "busy" data during state 48. At some later time, the I/O bus translator 36 (FIG. 1) will signal the requesting processor to again arbitrate for access to the address bus so that data can be transferred.

In the present invention, memory is divided into physical blocks having contiguous addresses. Consecutive memory requests will often request data from memory with consecutive addresses. If consecutively requested addresses are all within the same physical block then a master cannot efficiently pipeline requests. That is, each request must wait for the block to be free. Therefore, memory is logically interleaved so that consecutive addresses (line address which are described below) are in different physical blocks. This increases the probability that consecutive requests will be in different blocks.

In the present invention, memory is divided into groups, groups are divided into blocks, blocks are divided into lines, and lines are divided into 8-bit bytes. A byte is the minimum quantity of memory which can be addressed via the address bus. As described above, data is transferred in quads. A line is the amount of data transferred in one data quad. In the preferred embodiment, the data bus may be 32, 64 or 128 bits wide. The maximum amount of data which can be transferred in a transaction (one line) is 4 times the bus width (one full quad). For example, if the data bus is 32 bits wide, the maximum amount of data to be transferred in a transaction is 16 bytes (4 states, 32 bits per state). The blocks are interleaved so that consecutive line address are in different physical blocks.

In the present invention, each block has a unique identification (block ID). Each master device capable of initiating memory transactions maintains a queue of block IDs. When any processor successfully gains access to the bus and requests memory, the block ID of the requested line of data is placed in the queue of all masters. At the end of the standard memory transaction time, the block ID is dropped from the queue in each master. Before requesting access to the bus for memory data, a master first checks the queue for the requested block ID. If the requested block ID is in the queue, the corresponding memory block is busy. A master is prohibited from requesting data from a busy block.

The following discussion describes how addresses are mapped into block IDs and how blocks are interleaved by line address. However, before describing the general mapping algorithm, the following example using fixed sizes and a simple 16-bit address may be helpful. In this example, there are 16 blocks of memory divided into 4 groups with 4 blocks per group. In this example, there are 16 bytes per line. The goal is to map 16-bit addresses into blocks interleaved by line address and to define a unique ID for each block.

| Bit # | function |
|---|---|
| 0 | Group number |
| 1 | Group number |
| 2 | Line address |
| 3 | Line address |
| 4 | Line address |
| 5 | Line address |
| 6 | Line address |
| 7 | Line address |
| 8 | Line address |
| 9 | Line address |
| 10 | Line address & Block number |
| 11 | Line address & Block number |
| 12 | Byte address |
| 13 | Byte address |
| 14 | Byte address |
| 15 | Byte address |

In the above example, bit 0 is the most significant bit, bit 15 is the least significant bit. The most significant (highest) 2 bits of the address define the group, the next lower 10 address bits define the line address and the lowest 4 bits define the byte address within a line. In the example, interleaving may be accomplished by defining the lowest 2 bits of the line address as the block number. In this example, in each group there are 4 blocks numbered 0-3. Line 0 is in block 0, line 1 is in block 1 and so forth wrapping back with line 4 in block 0, line 5 in block 1 and so forth. In this example with 4 blocks per group, the block number is the line address modulo 4.

In the above example, 2 bits of group number and 2 bits of block number uniquely identify a block. Therefore, 2 bits of group number and 2 bits of block number define a 4-bit block ID which can be stored in a queue.

In the above example, the block number is the line address modulo 4. To generalize the above example, a number of N blocks requires a computation of modulo N. This requires complex hardware if any arbitrary number N is allowed. Restricting N to an even power of 2 reduces the modulo operation to a simple bit shift. However, this is too inflexible when adding additional memory. The scheme used in the preferred embodiment is a compromise between complexity and flexibility. It permits an arbitrary number within a limited range, resulting in a computation that can be accomplished with two simple adders.

In the preferred embodiment, an address is 32 bits. The upper (most significant) 2 bits define the group number. The minimum size of a block is 8 megabytes ($2^{23}$ bytes) Therefore, the least significant 23 bits (or more) define a byte address. In the preferred embodiment, the maximum number of blocks per group is 64 ($2^6$). Therefore 6 bits are needed to define a block number. A block ID then consists of 8 bits, 2 bits of group number and 6 bits of block number.

The block number is computed as follows:

Let N = the number of blocks per group.
Let I = integer value of $\log_2(N)$.
Let S = the upper 9 bits of the starting address of the group.
Let B = the upper 9 bits of the 32-bit address.
Let A = the lower I bits of the line address.

Figure 4:
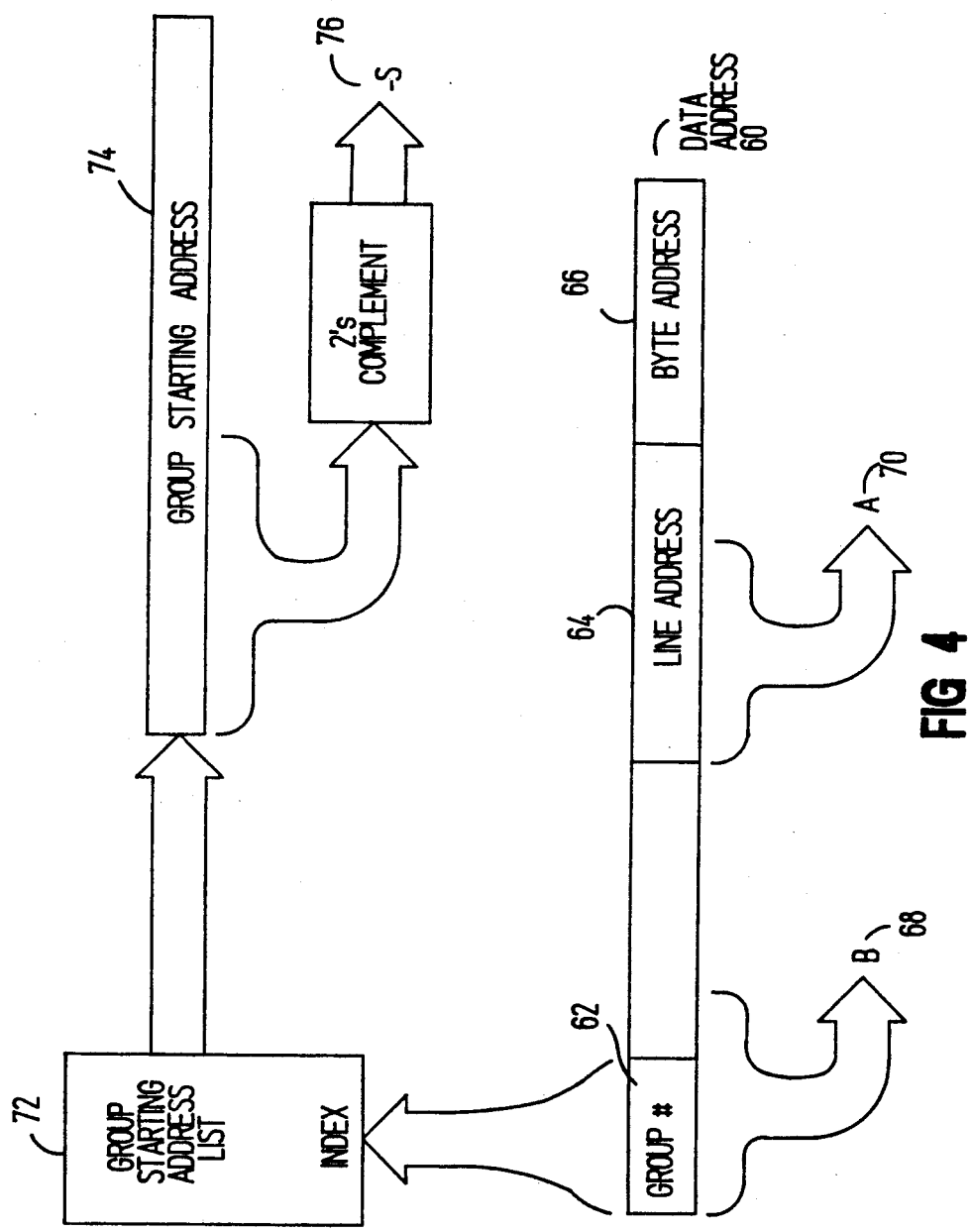
FIG. 4 is a block diagram illustrating the computation of a block ID from a block address.

FIG. 4 illustrates the above number definitions which are used in the computation of block ID. Data address 60 is logically divided into a 2-bit group number 62, line address 64 and byte address 66. The upper 9 bits of data address 60 define the number B 68. The upper I bits of line address 64 define the number A 70. The group number 62 is used as an index into a list of starting addresses 72 to select the group starting address 74 of the corresponding group. The 2's complement of the upper 9 bits of the selected group starting address 74 defines the number −S 76.

The block number is then computed as B+A−S. If this result is greater than N, then N is subtracted from the result. The range of the result can be seen as follows. The range of B minus S is 0 to (N−1). This is by definition since S is the beginning address of a group and the number of blocks per group is N. When an I-bit number (A) is added to that result, the range of the result is less than 2N−1 because by definition A is less than or equal to N. If the result is greater than N, then N is subtracted. The end result is a number less than N. Further detail and examples may be found in the Brockmann-1 application referenced earlier.

Figure 5:
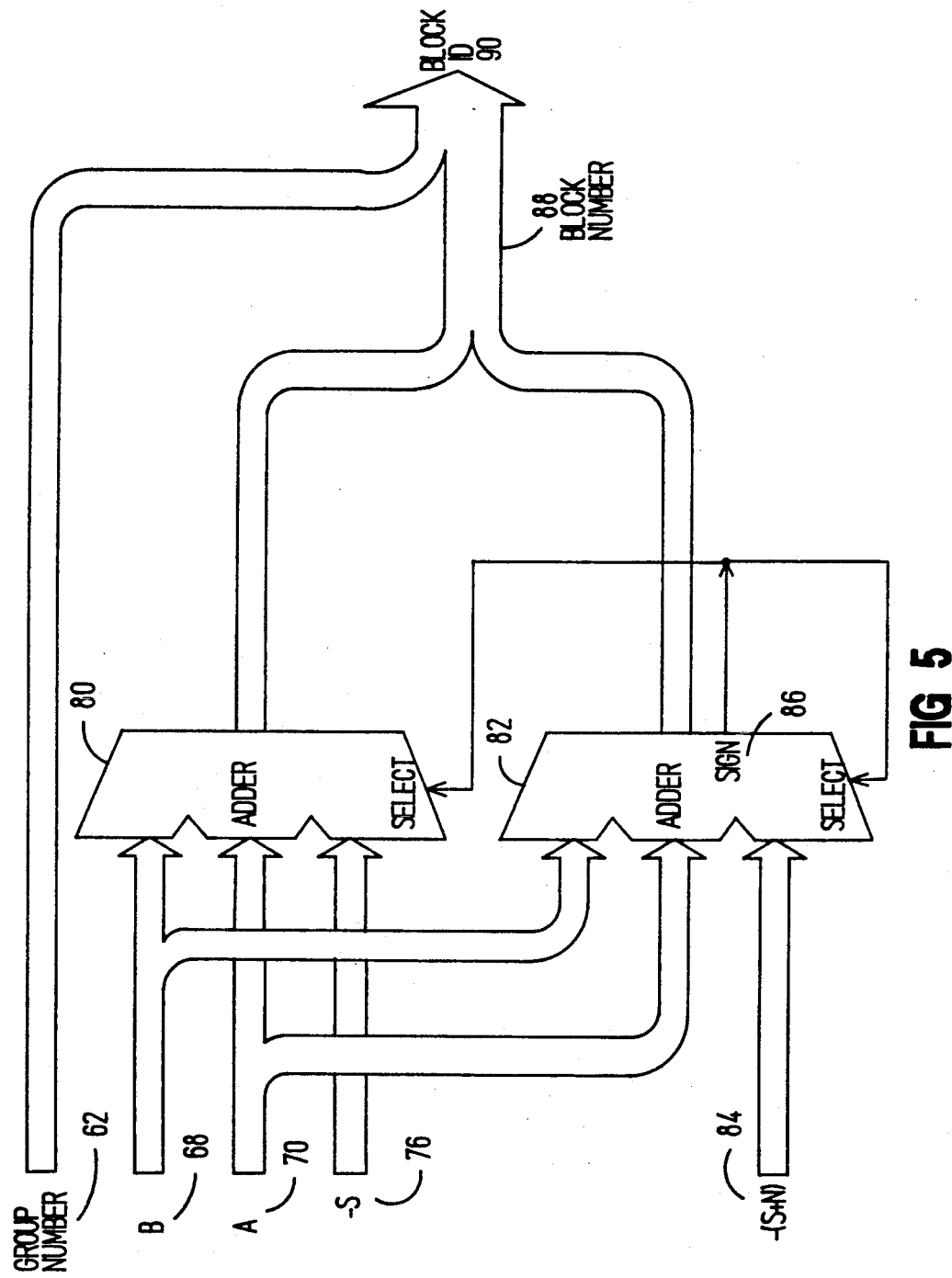
FIG. 5 is a block diagram illustrating circuitry to compute a block ID from a block address.

FIG. 5 illustrates the block ID computation as implemented in the preferred embodiment. In FIG. 5, numbers B 68, A 70, -S 76 and group number 62 all correspond to the identically numbered and named multi-bit numbers in FIG. 4. Two 3-input adders are used to compute a block ID. The first adder 80 computes B+A−S. The second adder 82 computes B+A−(S+N). S 76 and (S+N) 84 are fixed at configuration time. The outputs of the adders are computed in parallel. The sign of B+A−(S+N) 86 is used as a select signal to select which adder output is used for the block number 88. Group number 62 combined with block number 88 is the block ID 90.

Figure 6:
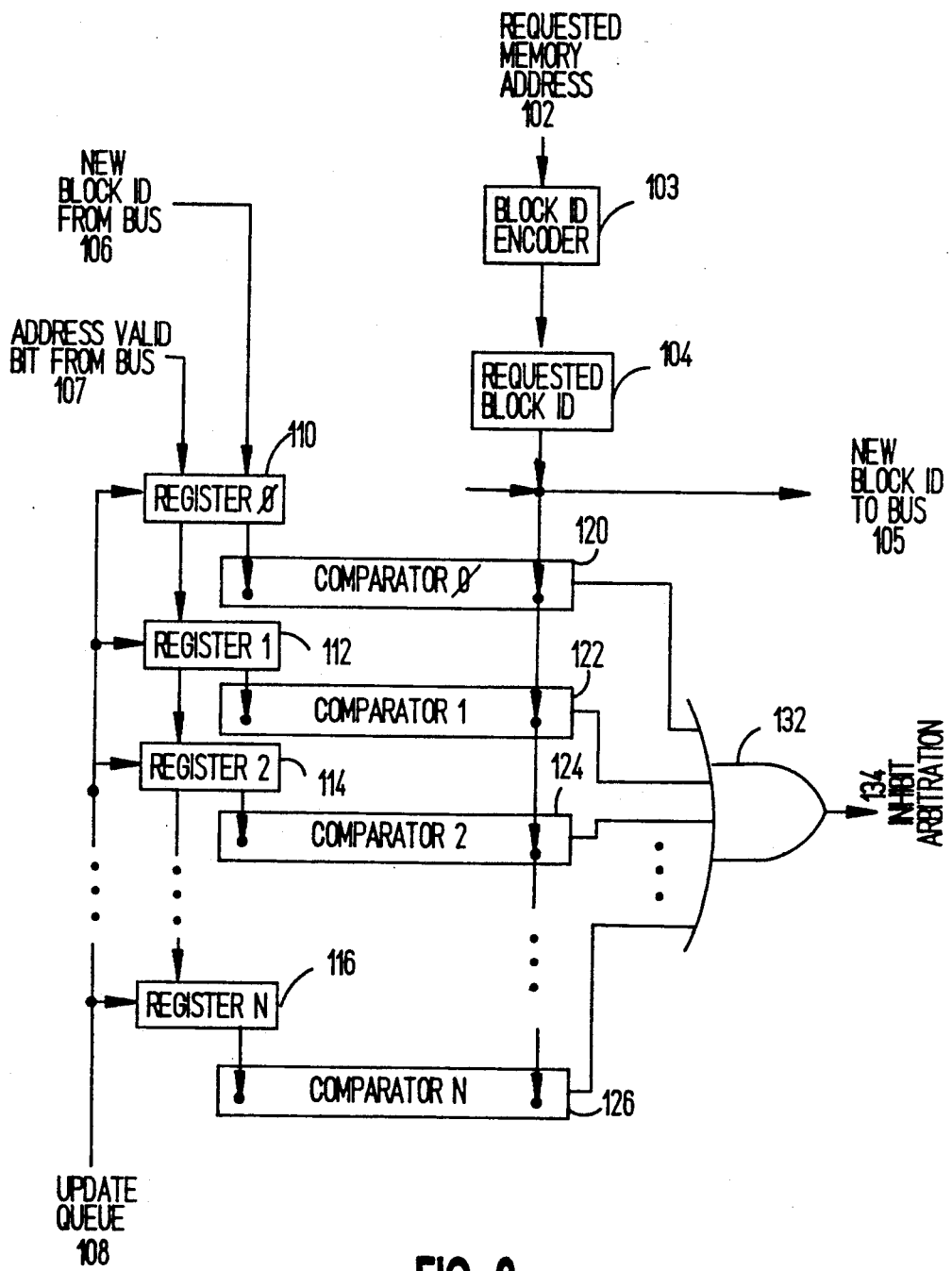
FIG. 6 is a block diagram of a block ID queue within a master.

FIG. 6 illustrates a block ID queue within a master. The circuitry illustrated in FIG. 6 exists within each master device capable of initiating memory transactions. The block ID queue is a series of storage registers 110, 112, 114, 116. When a master requests a transaction with a memory address, the requested memory address 102 is encoded by block ID encoder 103 to generate a requested block ID 104. The block ID encoder 103 encompasses the computations illustrated in FIGS. 4 and 5. If arbitration is initiated and is successful, the requested block ID 104 is placed on the bus as a new block ID 105. The new block ID 105 sent by the requesting master is received by each master as an input new block ID 106 for addition to the local block ID queue.

The update queue signal 108 is generated once during each control state quad. At each occurrence of the update queue signal 108, the new block ID 106 from the bus is shifted into register 0 110, the contents of register 0 110 are shifted to register 1 112, the contents of register 1 112 are shifted to register 2 114 and so forth. At each occurrence of the update queue signal 108, the contents of register N 116 are overwritten. Therefore, block IDs remain in registers 110, 112, 114, 116 for a fixed number of control state quads and are then simply discarded. If no master is requesting a memory transaction during a particular control state quad, there must be a method to indicate that the corresponding block ID is not a valid ID. One approach is to use an unused "dummy" block ID for the new block ID 106. However, in the preferred embodiment, the address bus has an address valid bit which indicates whether a valid address has been placed on the address bus. This address valid bit 107 is carried along with the block ID 106 as an additional bit in the block ID queue. If the address valid bit 107 from the bus is logical 1, the corresponding block ID 106 is valid. That is, a corresponding address was requested during an address control state.

The discussion above assumed that the requested memory block was not busy and the requesting master was then allowed to arbitrate for access to the bus. To determine if the requested memory block is busy, the requested block ID 104 is compared to stored block IDs in the queue as follows.

The contents of each register 110, 112, 114, 116 is one input of a digital comparator 120, 122, 124, 126. The other input of each digital comparator 120, 122, 124, 126 is the requested block ID 104 plus an extra bit, a valid address bit 109. The Valid address bit 109, which is always logical 1, is input along with the requested block ID 104 for comparison with the stored address valid bit 107 from the bus. For example, digital comparator 0 120 compares the requested block ID 104 and the address valid bit 109 to the block ID 106 and the address valid bit 107 stored in register 0 110. If the two inputs to a digital comparator 120, 122, 124, 126 are identical, the comparator output is logical "TRUE". Outputs from each digital comparator 120, 122, 124, 126 are coupled to inputs of logical "OR" gate 132. If any digital comparator 120, 122, 124, 126 has a logical "TRUE" output, then the inhibit arbitration signal 134 will be a logical "TRUE". If the inhibit arbitration signal 134 is logical "TRUE", the requested memory block must be busy and arbitration for the requested memory block is inhibited.

The length of the update queue is initialized at configuration time. At configuration time, the standard transaction time and the corresponding number of quads N in the transaction time are determined and fixed. Therefore, the block ID queue can be adjusted for different memory speeds.

From the preceding description, it can be seen that the present invention eliminates "busy" memory transactions. The present invention also eliminates the need for arbitration by memory devices. The present invention also eliminates the need for request queues, input data queues and output data queues in memory devices. As a result, bus utilization is improved and memory devices are streamlined.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is,

1. In a computer system, a method for improving bus utilization, the method comprising the steps of:
    (a) storing a memory address identification into an address storage when a memory transaction is initiated;
    (b) removing said memory address identification from said address storage when said memory transaction is completed;
    (c) checking the contents of said address storage before initiating a subsequent memory transaction to determine if a target memory address is busy;
    (d) initiating said subsequent memory transaction only if said target memory address is not busy; and
    (e) repeating steps (a) and (b) if said subsequent memory transaction is initiated.

2. A method as in claim 1 wherein step (a) further comprises the steps of:
    (a1) dividing a target memory into a plurality of blocks;
    (a2) interleaving said blocks; and
    (a3) computing a block identification from said target memory address so that for each block in said plurality of blocks, all target memory addresses within a block correspond to one unique block identification.

3. A method as in claim 2 further comprising the steps of:
 (a4) initiating said memory transaction during an address control state;
 (a5) setting an address valid bit to logical 1 if said memory transaction is initiated;
 (a6) setting said address valid bit to logical 0 if said address control state transpires without initiating said memory transaction;
 (a7) assigning said block identification and said address valid bit to said memory address identification each time said memory transaction is initiated;
 (a8) assigning an arbitrary block identification and said address valid bit to said memory address identification if said address control state transpires without initiating said memory transaction; and
 (a9) inserting said memory address identification into a queue within each master device in a plurality of master devices each time said address control state transpires.

4. A method as in claim 2 further comprising the steps of:
 (a4) initiating said memory transaction during an address control state;
 (a5) assigning said block identification to said memory address identification if said memory transaction is initiated;
 (a6) assigning an unused block identification to said memory address identification if said address control state transpires without initiating said memory transaction; and,
 (a7) inserting said memory address identification into a queue within each master device in a plurality of master devices each time said address control state transpires.

5. A method as in claims 3 or 4 wherein step (b) further comprises the step of:
 (b1) allowing the last target memory address identification in said queue to be overwritten when a new block identification is inserted into said queue.

6. In a computer system having a plurality of master devices, a bus, and memory, an apparatus for improving utilization of said bus, said apparatus comprising:
 storage means for storing a memory address identification when a memory transaction is initiated;
 removal means for removing said memory address identification from said storage means when said memory transaction is complete;
 detection means for detecting whether a target memory address identification is stored in said storage means, thereby determining whether an area of memory corresponding to said target memory address identification is busy; and,
 inhibiting means for inhibiting initiation of said memory transaction if said target memory address identification is stored in said storage means.

7. An apparatus as in claim 6 wherein said identification means further comprises:
 block means for dividing said memory into a plurality of blocks;
 block identification means for computing a plurality of block identifications, wherein each block in said plurality of blocks has a one-to-one correspondence to one block identification in said plurality of block identifications and wherein a plurality of memory addresses may correspond to one block identification;
 an address valid bit, wherein said address valid bit is set to logical 1 if said memory transaction is initiated during said address control state and said address valid bit is set to logical 0 if said memory transaction is not initiated during said address control state;
 said memory address identification comprising said block identification and said address valid bit if said memory transaction is initiated during said address control state; and
 said memory address identification comprising an arbitrary block identification and said address bit if a memory transaction is not initiated during said address control state.

8. An apparatus as in claim 6 wherein said identification means further comprises:
 block means for dividing said memory into a plurality of blocks;
 block identification means for computing a plurality of block identifications, wherein each block in said plurality of blocks has a one-to-one correspondence to one block identification in said plurality of block identifications and wherein a plurality of memory addresses may be assigned to one block identification;
 said memory address identification comprising said corresponding block address if said memory transaction is initiated during said address control state; and
 said memory address identification comprising an unused block identification if said memory transaction is not initiated during said address control state.

9. An apparatus as in claims 7 or 8 wherein said storage means and said removal means comprise a first-in first-out register queue wherein the last memory address identification in said queue is overwritten whenever a new memory address identification is inserted into said queue.

10. An apparatus as in claim 9 wherein said comparison means is a digital comparator.

* * * * *